(12) United States Patent
Marcella et al.

(10) Patent No.: US 10,733,246 B2
(45) Date of Patent: Aug. 4, 2020

(54) SYSTEM AND METHOD FOR IDENTIFYING A USER

(75) Inventors: Philip Marcella, Philadelphia, PA (US); Christopher McKenna, Glenside, PA (US); John Riviello, Mount Laurel, NJ (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 1084 days.

(21) Appl. No.: 13/315,105

(22) Filed: Dec. 8, 2011

(65) Prior Publication Data
US 2013/0151994 A1    Jun. 13, 2013

(51) Int. Cl.
*G06F 17/00* (2019.01)
*G06F 16/9535* (2019.01)

(52) U.S. Cl.
CPC ................................ *G06F 16/9535* (2019.01)

(58) Field of Classification Search
CPC .... G06F 3/048; G06F 3/04842; G06F 3/0482; G06F 3/0481; G06F 17/2247; G06F 17/048
USPC .......................................................... 715/760
See application file for complete search history.

(56) References Cited

U.S. PATENT DOCUMENTS

| | | | | |
|---|---|---|---|---|
| 5,848,427 | A * | 12/1998 | Hyodo | G06F 16/9574 715/209 |
| 7,016,875 | B1 * | 3/2006 | Steele et al. | 705/44 |
| 7,035,896 | B1 * | 4/2006 | Schneider | H04L 67/325 709/202 |
| 8,214,804 | B2 * | 7/2012 | Robertson | 717/124 |
| 2004/0181490 | A1 * | 9/2004 | Gordon et al. | 705/59 |
| 2012/0066577 | A1 * | 3/2012 | Saini et al. | 715/211 |

* cited by examiner

*Primary Examiner* — Scott T Baderman
*Assistant Examiner* — Hassan Mrabi
(74) *Attorney, Agent, or Firm* — Ballard Spahr LLP (57) ABSTRACT

Systems and methods for identifying a user are disclosed. One aspect comprises providing an address element and a class identifier, receiving a request for a file, wherein the request comprises the address element and the class identifier, comparing the class identifier to a comparator element, providing a first file if the class identifier is within the comparator element, and providing a second file if the class identifier is outside the comparator element.

17 Claims, 5 Drawing Sheets

SYSTEM AND METHOD FOR IDENTIFYING A USER

BACKGROUND

A webpage is typically a generic file and is presented to all users in a similar manner. Accordingly, an experience of a webpage to a particular user may not be tailored based upon a class of user. In some instances a "cookie" is used to store information such as logon credentials and pre-defined user preferences. However, "cookies" are transitory in nature and often not enabled for use. These and other shortcomings are identified and addressed by the disclosure.

SUMMARY

It is to be understood that both the following general description and the following detailed description are exemplary and explanatory only and are not restrictive, as claimed. Provided are methods and systems for identifying a user or a class of user. The methods and systems described herein, in one aspect, distinguish a classification of user in order to deliver a unique experience for each class of user without utilizing conventional "cookies."

In an aspect, a method of identifying a class of user can comprise provisioning an address element and a class identifier and receiving a request for a file, wherein the request comprises the address element and the class identifier. The class identifier can be compared to a comparator set. A first file can be provided if the class identifier is within the comparator set and a second file can be provided if the class identifier is outside the comparator set.

In another aspect, a method of identifying a class of user can comprise provisioning an address element and a class identifier and associating the address element and the class identifier with a user interface element. A request for a file can be transmitted in response to receiving a selection of the user interface element, wherein the request comprises the address element and the class identifier. A first file or a second file can be received based upon the class identifier associated with the user interface element.

In yet another aspect, a system for identifying a class of user can comprise a memory for storing a first file and a second file; and a processor in signal communication with the memory. The processor can be configured to perform the steps of: receiving a request for a file, wherein the request comprises an address element and a class identifier; comparing the class identifier to a comparator set; providing the first file if the class identifier is within the comparator set; and providing the second file if the class identifier is outside the comparator set.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system can be configured to distinguish a classification of user in order to deliver a unique experience for each class of user.

Figure 1:
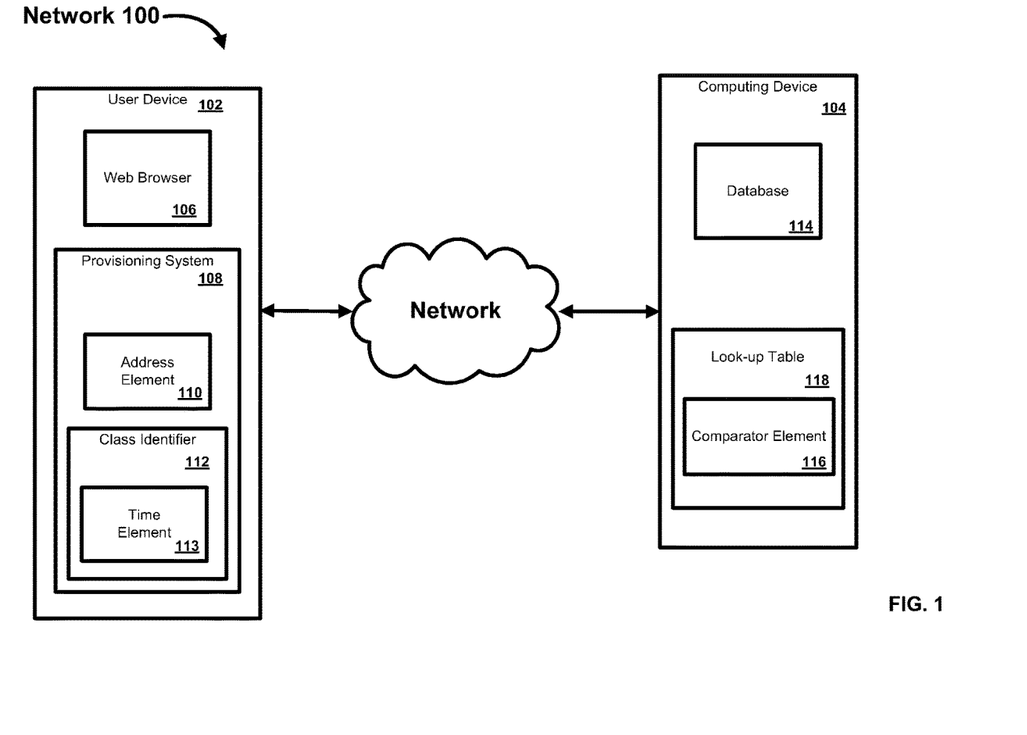
FIG. 1 is a block diagram of an exemplary network.

FIG. 1 illustrates various aspects of an exemplary network in which the present methods and systems can operate. The present disclosure relates to systems and methods for identifying a class of user. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a user device 102 in communication with a computing device 104 such as a server, for example. The computing device 104 can be disposed locally or remotely relative to the user device 102. As an example, the user device 102 and the computing device 104 can be in communication via a private or public network such as the Internet. Other forms of communications can be used such as wired and wireless telecommunication channels, for example.

In an aspect, the user device 102 can be an electronic device such as a computer, a smartphone, a laptop, a tablet, a set top box, or other device capable of communicating with the computing device 104. As an example, the user device 102 can comprise a web browser 106 for providing an interface to a user to interact with the user device 102 and/or the computing device 104. The web browser 106 can be any interface for presenting information to the user and receiving a user feedback such as Internet Explorer, Mozilla Firefox, Google Chrome, Safari, or the like. Other software, hardware, and/or interfaces can be used to provide communication between the user and one or more of the user device 102 and the computing device 104. As an example, the web browser 106 can request or query various files from a local source and/or a remote source.

In an aspect, the user device 102 can comprise a provisioning system 108 for configuring and/or assigning resources such as communication resources, for example. As an example, the provisioning system 108 can be configured to, among other things: authenticate the user device 102 with a particular network; install drivers; configure a modem; setup a wired or wireless Local Area Network (LAN); secure an operating system; configure browser provider-specifics; provision electronic mail (e.g. create mailboxes and aliases); configure electronic mail; install additional support software; install add-on packages; and the like. As a further example, the provisioning system 108 can be configured to provision one or more of an address element 110 and a class identifier 112 to the user.

In an aspect, the address element 110 can be a uniform resource identifier (URI) (e.g., a uniform resource locator (URL)), a network address, an Internet address, or the like. As an example, the address element 110 can be relied upon to establish a communication session between the user device 102 and the computing device 104. As a further example, the address element 110 can direct the web browser 106 to request or query a particular file or webpage. The requested file can be stored locally to the computing device 104 or remotely, such as in a database 114, for example.

In an aspect, the address element 110 can be configured as a "Home Page" for the web browser 106, wherein upon each startup of the web browser 106, the address element 110 requests a particular file or webpage associated with the "Home Page" and presents the requested file or webpage to the user. As an example the address element 110 can be persistently stored. As a further example, the address element 110 can be persistently stored on or locally to the user device 102.

In an aspect, the class identifier 112 can be any identifier, token, character, string, or the like, for differentiating one user or user device from another user or user device. In an aspect, the class identifier 112 can comprise a time element 113 such as a date, a time, or combination thereof. As an example, the class identifier 112 can comprise a character string representing a calendar date such as "07182011" representing "Jul. 18, 2011." The class identifier 112 can comprise an identifier other than a date. For example, the class identifier 112 can comprise a value, token, character, string, or the like representing a particular classification of user that is not dependent on time or date. As a further example, the classification of user can be based upon a pre-defined user level, user authority, user history, user location, or other classification or distinction. As a further example, the class identifier 112 can comprise a path or file resource identifier for locating a particular file. In an aspect, the class identifier 112 can be persistently stored. As an example, the class identifier 112 can be persistently stored on or locally to the user device 102.

In an aspect, the computing device 104 can be a server for communicating with the user device 102. As an example, the computing device 104 can manage the intercommunication between the user device 102 and the database 114 for sending and receiving data therebetween. In an aspect, the database 114 can store a plurality of files (e.g. web pages). As an example, the user device 102 can request a file from the database 114. As a further example, the user device 102 can retrieve a file from the database 114.

In an aspect, the user device 102 can be in communication with a dedicated software to consume various media types. As an example, the software can be executed on the user device 102. The software can provide the various media types to the user device 102 directly or establish a connection to a source of the media types such as the computing device 104 or database 114, for example. As a further example, the software can be executed remotely relative to the user device 102. In an aspect, the media type presented on the user device 102 is based upon the class identifier 112 associated with the user or user device 102.

In an aspect, the computing device 104 can comprise a comparator element 116. It is understood that the comparator element 116 can be stored locally or remotely relative to the computing device 104. As an example, the comparator element 116 can be stored in the database 114. As a further example, the comparator element 116 can be stored in a look-up table 118. In an aspect, the comparator element 116 can comprise one or more of a value, token, character, character string, label, classifier, pre-determined time period, pre-determined date, time range, finite expression, or the like. The comparator element 116 can comprise single or multiple characters, character strings, ranges, thresholds, values, and the like, for comparison. The comparator element 116 can be based upon a pre-defined user level, user authority, user history, user location, or other classification or distinction.

As an example, one or more of the user device 102 and the computing device 104 can be configured to compare the class identifier 112 to the comparator element 116 to determine whether the class identifier 112 is within the comparator element 116. In an aspect, the class identifier 112 is compared to the comparator element 116 to determine if the class identifier 112 matches at least a portion of the comparator element 116. In an aspect, the class identifier 112 is compared to the comparator element 116 to determine if the class identifier 112 is within a range or threshold defined by the comparator element 116. As a further example, a script or software can be executed to compare the class identifier 112 to the comparator element 116.

Figure 2:
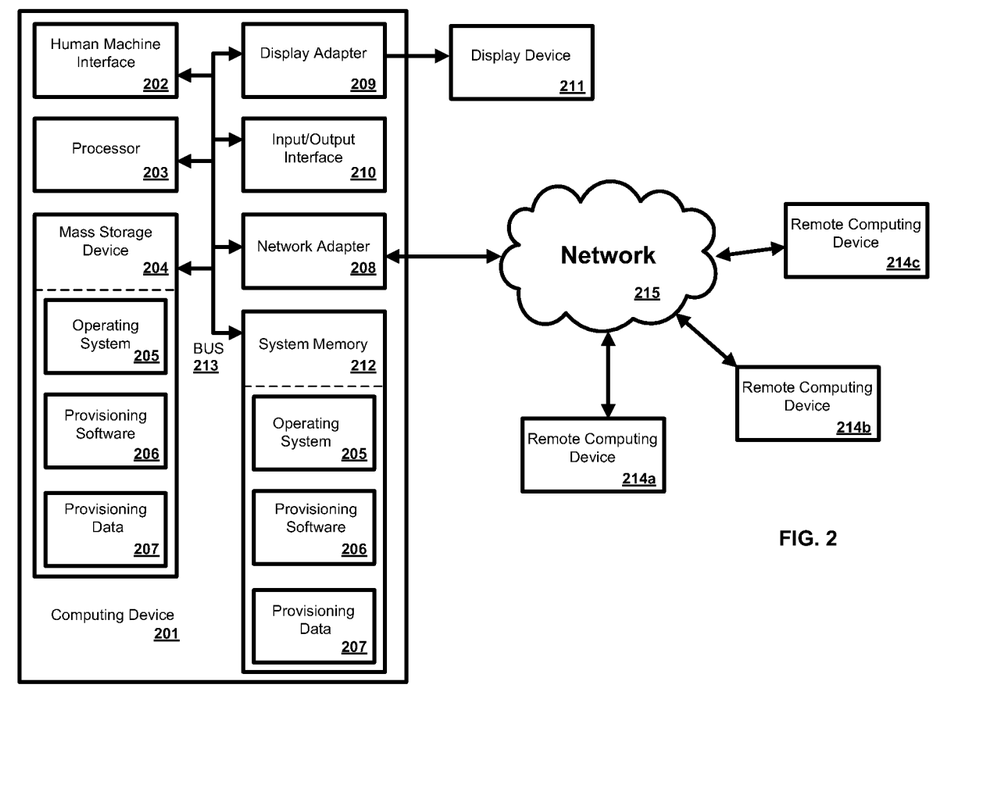
FIG. 2 is a block diagram of an exemplary computing system.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, provisioning software 206, provisioning data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as provisioning data 207 and/or program modules such as operating system 205 and provisioning software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and provisioning software 206. Each of the operating system 205 and provisioning software 206 (or some combination thereof) can comprise elements of the programming and the provisioning software 206. Provisioning data 207 can also be stored on the mass storage device 204. Provisioning data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphi-cal, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of provisioning software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described in greater detail below, provided are methods for identifying a class of user in order to deliver a unique experience to each user or a type of content to each user, based upon a class of user.

Figure 3:
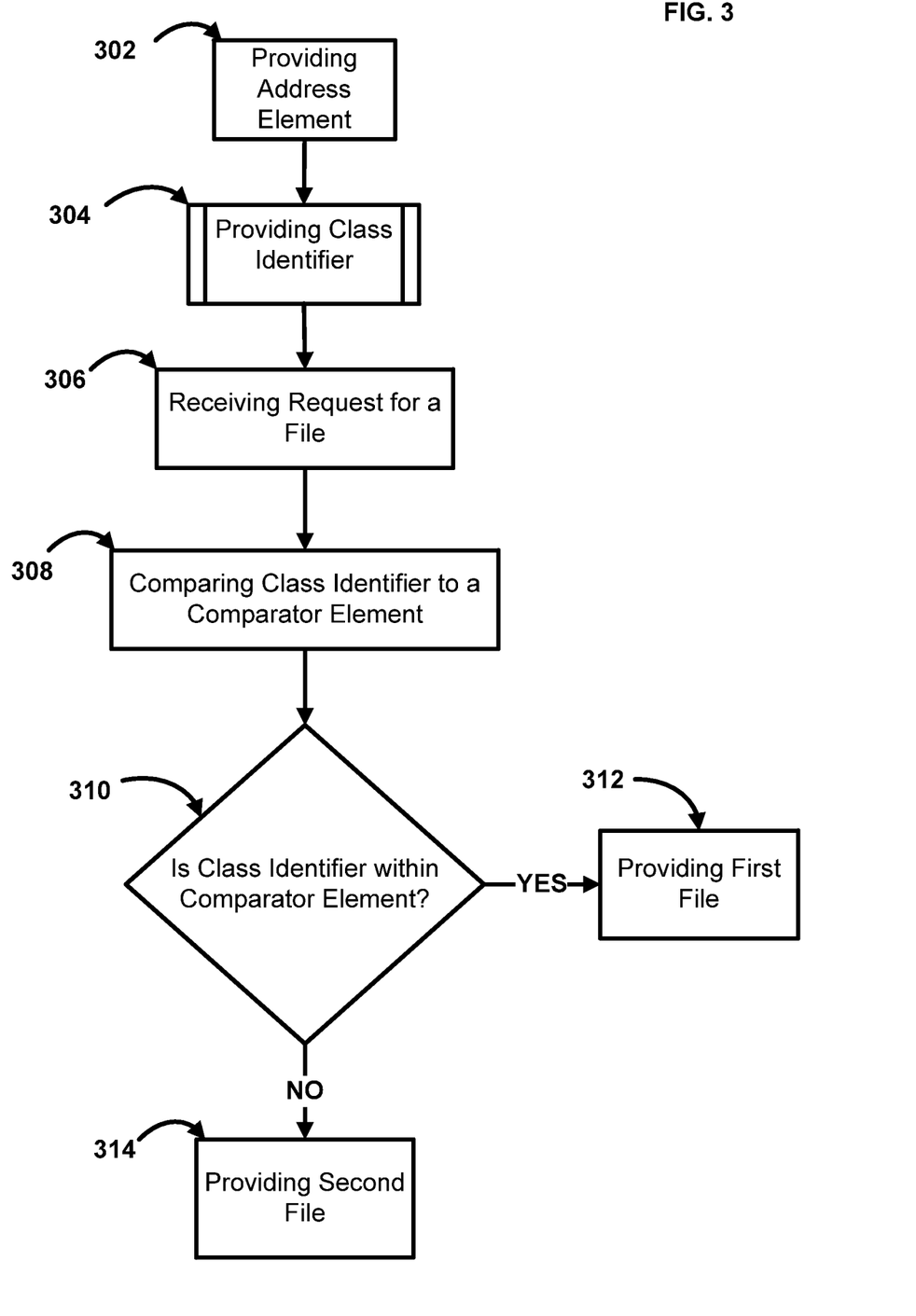
FIG. 3 is a flow chart of an exemplary method of identifying a user.

FIG. 3 illustrates an exemplary method for identifying a class of user. The method illustrated in FIG. 3 will be discussed in reference to FIGS. 1-2. In step 302, the address element 110 can be provided (e.g., provisioned) for the user device 102. In an aspect, the address element 110 can be provisioned by configuring home page settings of the web browser 106 such that the home page of the web browser 106 is directed to the address element 110. As an example, the address element 110 can be provisioned during one or more of a network configuration procedure, an Internet service installation, an activation procedure for telecommunication services, and the like. However, the address element 110 can be provisioned at any time using any provisioning procedure. As a further example, the address element 110 can be provisioned by configuring a software setting such as a toolbar setting for assigning a homepage, a bookmark, a favorite's page, or the like.

In step 304, the class identifier 112 can be provided (e.g., provisioned) for the user device 102. In an aspect, the class identifier 112 can be provisioned by configuring home page settings of the web browser 106 such that a home page request by the web browser 106 requests the address element 110 comprising the class identifier 112. As an example, the class identifier 112 can be provisioned during one or more of a network configuration procedure, an Internet service installation, an activation procedure for telecommunication services, and the like. However, the class identifier 112 can be provisioned at any time using any provisioning procedure. As a further example, the class identifier 112 can be provisioned by configuring a software setting such as a toolbar setting for assigning a homepage, a bookmark, a favorite page, or the like.

Figure 4:
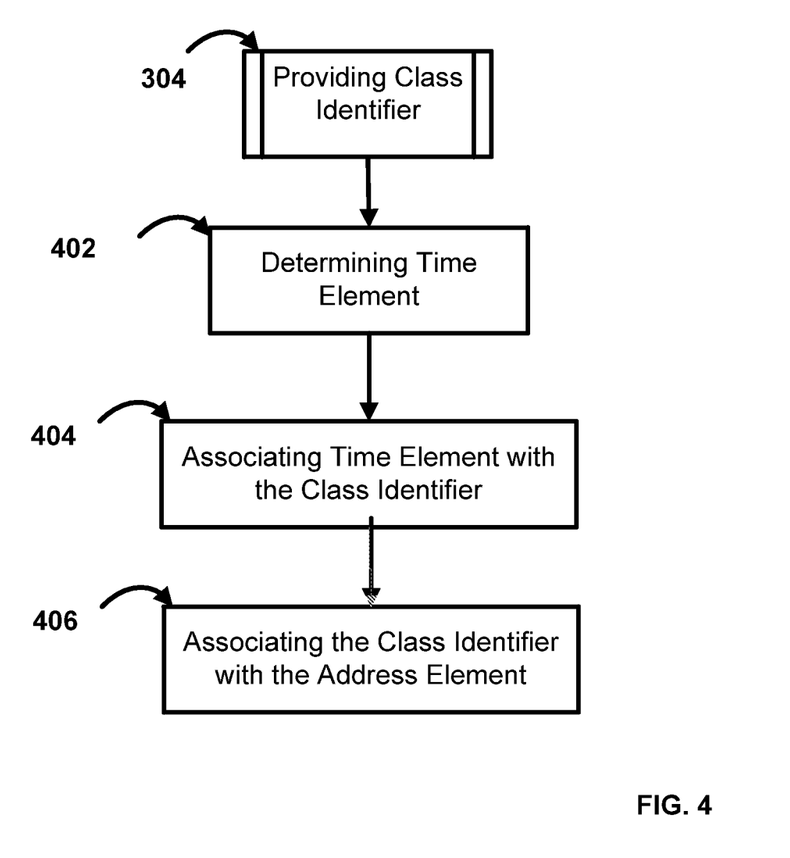
FIG. 4 is a flow chart of a sub-routine of the method of FIG. 3.

FIG. 4 illustrates an exemplary method for provisioning the class identifier 112. The method illustrated in FIG. 4 will be discussed in reference to FIGS. 1-2. In step 402, the time element 113 can be determined. As an example, the time element 113 is defined by the provisioning system 108. As a further example, the time element 113 can be retrieved from a timing source, such as a system clock of the user device 102, a universal clock, an electronic calendar, or the like, disposed locally or remotely to the user device 102. Other sources of the time element 113 can be used.

In step 404, the time element 113 can be associated with the class identifier 112. As an example, the class identifier 112 can be a character string representing the time element 113, such as the class identifier 112 of "07182011" representing the time element 113 of the date "Jul. 18, 2011." The class identifier 112 can comprise an identifier other than a date. For example, the class identifier 112 can comprise a value, token, character, string, or the like representing a particular classification of user that is not dependent on time or date. As a further example, the classification of user can be based upon a pre-defined user level, user authority, user history, user location, or other classifier.

Figure 5:
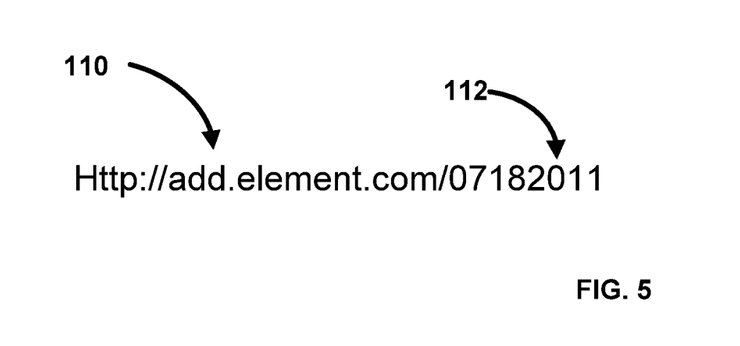
FIG. 5 is an exemplary address element and class identifier.

In step 406, the class identifier 112 can be associated with the address element 110. In an aspect, the class identifier 112 can be a character string appended to the address element 110. As an example, the address element 110 is a URL and the class identifier 112 is a character string representing a time or date, as illustrated in FIG. 5. However, other character strings, tokens, locators, and the like can be used to represent the address element 110 and the class identifier 112. In an aspect, when the address element 110 is typed into a web address bar of the web browser 106 of a particular user device 102, the class identifier 112 for the particular user device 102 is automatically appended to the address element 110 in order to return a particular file. As an example, the class identifier 112 for a particular user device 102 can be persistently stored, wherein, upon receiving a request for the address element 110 (e.g., http://add.element.com), the user device 102 can automatically resolve a webpage based upon the address element 110 and the class identifier 112 (e.g. 07182011) associated with the particular user device 112.

Returning to FIG. 3, a request for a file can be transmitted by the user system 102, at step 306. As an example, the request can comprise the address element 110 and the class identifier 112. As a further example, the address element 110 and the class identifier 112 can be relied upon by the web browser 106 to cause the web browser 106 to query a particular computing device 104 for a particular file. In an aspect, the address element 110 and the class identifier 112 can be relied upon to cause particular media or content to be transmitted to the user device 102. As an example, software can be implemented to control media that is transmitted to the user device 102 in response to one or more of the address element 110 and the class identifier 112. As a further example, user devices 102 associated with different class identifiers 112 can receive different media types or content.

In step 308, the class identifier 112 can be compared to the comparator element 116. In an aspect, the comparator element 116 represents a time period and the class identifier 112 is compared to the time period to determine if the class identifier 112 is within the time period represented by the comparator element 116. As an example, the class identifier 112 can represent a date that the class identifier 112 was initially provisioned. As a further example, the comparator element 116 can represent a pre-determined time period reflecting a "new user" period. In an aspect, when the class identifier 112 is compared to the comparator element 116, it can be determined whether the provisioning date represented by the class identifier 112 is within the "new user" period or has exceeded the "new user" period. However, other time periods, ranges, pre-determined comparative values, characters and the like can be represented by the comparator element 116.

In step 310, a first file can be provided to the user based upon the comparison of the class identifier 112 and the comparator element 116. In an aspect, the first file can be provided to the user if the class identifier 112 is within the comparator element 116. As an example, the first file can be a webpage. As a further example, the first file can represent a unique user experience pre-defined for "new users". Accordingly, if the class identifier 112 is within the comparator element 116, the first file can provide a "new user" or "first time" experience to the user. However, any experience can be provided by the first file, such as unique experiences for pre-defined user levels, user subscription, or user authority, for example.

In step 312, a second file can be provided to the user based upon the comparison of the class identifier 112 and the comparator element 116. In an aspect, the second file can be provided to the user if the class identifier 112 is outside the comparator element 116. As an example, the second file can be a webpage. The first file can be different from the second file. As a further example, the second file can represent an experience that is different from the experience provided by the first file. In an aspect, the second file can provide a standard user experience pre-defined for veteran users, returning users, or the like. Accordingly, if the class identifier 112 is outside the comparator element 116, the second file can provide a non-first time experience or a "veteran user" experience to the user. However, the first and second files can represent any data and/or experience and need not be limited to new user and veteran user differentiation. For example, any experience can be provided by the second file such as unique experiences for pre-defined user levels, user subscription, or user authority.

Figure 6:
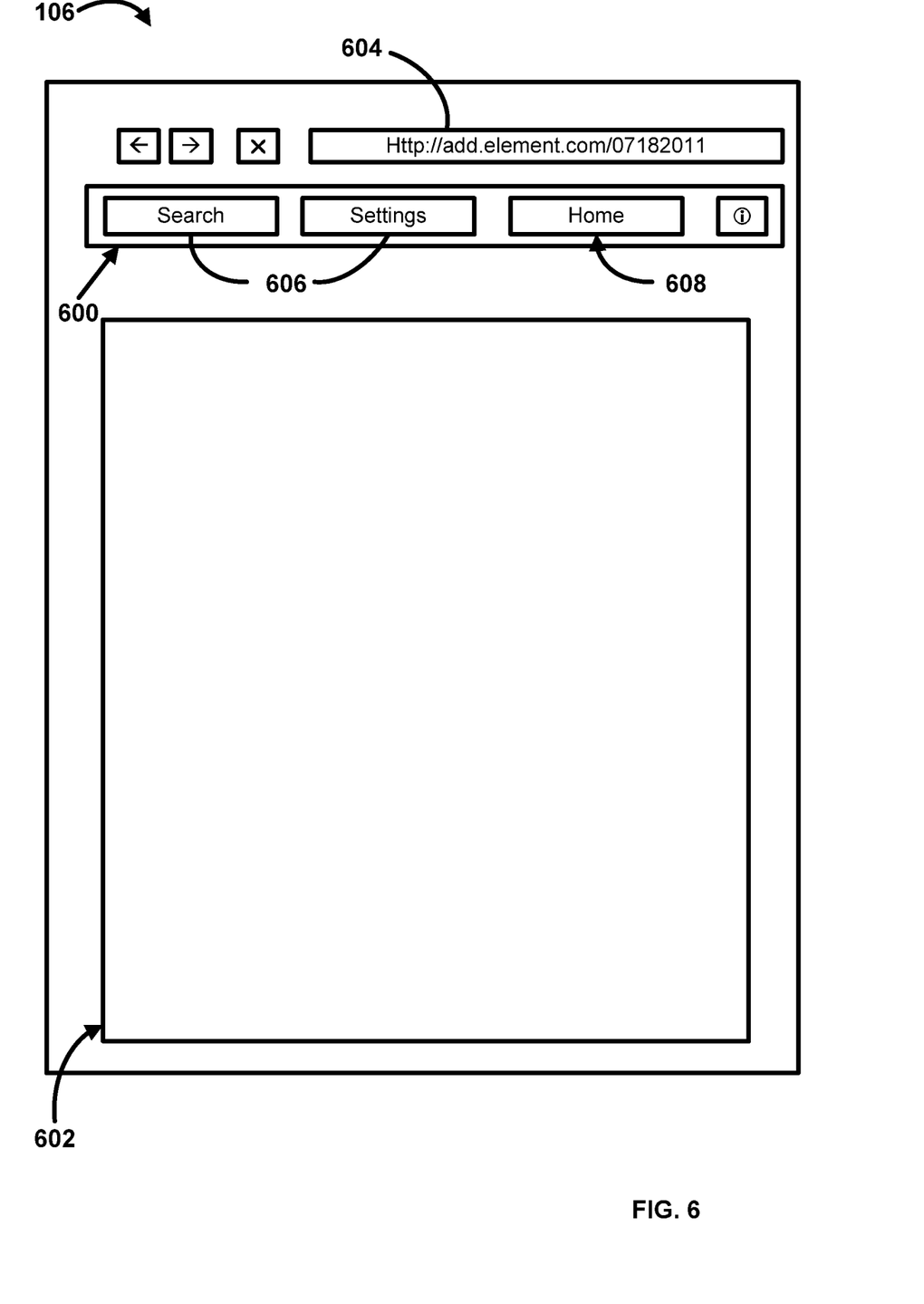
FIG. 6 is a representation of a web browser.

In an aspect, software can be used to implement methods of identifying a class of user. As described in greater detail below, the methods and systems can comprise a software interface 600, as illustrated in FIG. 6. By way of example, the interface 600 can be integrated with the web browser 106. As a further example, the interface 600 can be loaded to the user device 102 as an add-on software package. In an aspect, the loading of the interface 600 can be tracked in order to identify the user devices that comprise the interface 600.

The methods and systems disclosed can utilize one or more interfaces 600 to perform one or more functions in one or more locations. FIG. 6 illustrates an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

In an aspect, the web browser 106 can comprise a browser window 602 for displaying information (e.g. web pages, files, etc.) to the user. As an example, the web browser 106 can comprise an address bar 604 or URL bar to allow a user to input a URL for directing the requests of the web browser 106. In an aspect, the interface 600 can be a toolbar disposed adjacent the address bar 604 of the web browser 106 and including one or more user interface elements, buttons, or engageable menus. The interface 600 can be presented to the user in any position, form, and environment. As an example, the interface 600 can comprise a plurality of user interface elements such as user-engageable buttons 606 for executing various associated functions (e.g. search function, settings modification, and the like.)

In an aspect, the interface 600 can comprise a user interface element such as home button 608 or a homepage button for directing the web browser 106 to a pre-defined file or webpage associated with the home button 608. As an example, the address element 110 and class identifier 112 are associated with the home button 608, whereby a selection of the home button 608 causes the web browser 106 to request a particular file associated with the address element 110 and the class identifier 112.

In an aspect, when the home button 608 is selected, the class identifier 112 can be compared to the comparator element 116. In an aspect, the comparator element 116 represents a time period and the class identifier 112 is compared to the time period to determine if the class identifier 112 is within the time period represented by the comparator element 116. As an example, the class identifier 112 can represent a date that the class identifier 112 was initially provisioned. As a further example, the comparator element 116 can represent a pre-determined time period reflecting a "new user" period. Accordingly, when the class identifier 112 is compared to the comparator element 116, it can be determined if the provisioning date represented by the class identifier 112 is within the "new user" period or has exceeded the "new user" period. As an example, if the class identifier 112 is within the comparator element 116, the web browser 106 can retrieve a particular file and can provide a first experience to the user. As a further example, if the class identifier 112 is outside the comparator element 116, the web browser 106 can retrieve a particular file and can provide a second experience to the user, different from the first experience. In this way, the class identifier 112 can be relied upon to determine the experience of the user. The comparator element 116 and class identifier 112 can be defined to distinguish any grouping, categorization, or classification of user in order to deliver a unique experience for each class of user.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
  receiving, by a computing device, a request for a web browser homepage, wherein the request comprises a time element indicative of a date that a service was provisioned;
  determining, by the computing device, whether the date is within a range of dates, and
  providing, by the computing device, a web page comprising a version of the web browser homepage, wherein the version of the web browser homepage comprises a new user experience when the date is within the range of dates, and wherein the version of the web browser homepage comprises a veteran user experience when the date is outside the range of dates.

2. The method of claim 1, wherein the request further comprises an address element indicative of a Uniform Resource Locator (URL) for the web browser homepage.

3. The method of claim 2, wherein the address element is persistently stored.

4. The method of claim 1, wherein the request further comprises a class identifier indicative of a Uniform Resource Locator (URL) for the web browser homepage.

5. The method of claim 4, wherein the class identifier is persistently stored.

6. The method of claim 1, wherein the range of dates represents a pre-determined time period reflecting a new user period.

7. The method of claim 1, wherein the range of dates is based on one or more of a user level, a user authority, a user history, or a user location.

8. A method comprising:
  associating, by a computing device, a time element with a user interface element, wherein the time element is indicative of a date that a service was provisioned;
  receiving, by the computing device, a selection of the user interface element;

sending, by the computing device based on the selection of the user interface element, a request for a web browser homepage, wherein the request comprises the time element;

determining, by the computing device, whether the date is within a range of dates, and receiving, by the computing device, a web page comprising a version of the web browser homepage, wherein the version of the web browser homepage comprises a new user experience when the date is within the range of dates, and wherein the version of the web browser homepage comprises a veteran user experience when the date is outside the range of dates.

9. The method of claim 8, wherein the request further comprises an address element and a class identifier, and wherein the address element and the class identifier are indicative of a Uniform Resource Locator (URL) for the web browser homepage.

10. The method of claim 9, wherein the address element and the class identifier are persistently stored.

11. The method of claim 9, wherein the class identifier was assigned when the service was provisioned.

12. The method of claim 8, wherein the range of dates is based on one or more of a user level, a user authority, a user history, or a user location.

13. A method comprising:

determining, by a computing device, whether a time element associated with a request for a web browser homepage is within a range of dates, wherein the time element is indicative of a date that a service was provisioned; and providing, a web page comprising a version of the web browser homepage, wherein the version of the web browser homepage comprises a new user experience when the date is within the range of dates, and wherein the version of the web browser homepage comprises a veteran user experience when the date is outside the range of dates.

14. The method of claim 13, wherein the request further comprises an address element and a class identifier, and wherein the address element and the class identifier are indicative of a Uniform Resource Locator (URL) for the web browser homepage.

15. The method of claim 14, wherein the address element and the class identifier are persistently stored.

16. The method of claim 14, wherein the class identifier was assigned when the service was provisioned.

17. The method of claim 13, wherein the range of dates is based on one or more of a user level, a user authority, a user history, or a user location.

* * * * *